No. 721,571. PATENTED FEB. 24, 1903.
G. W. KRAMER.
ELEVATOR.
APPLICATION FILED APR. 3, 1901.
NO MODEL.
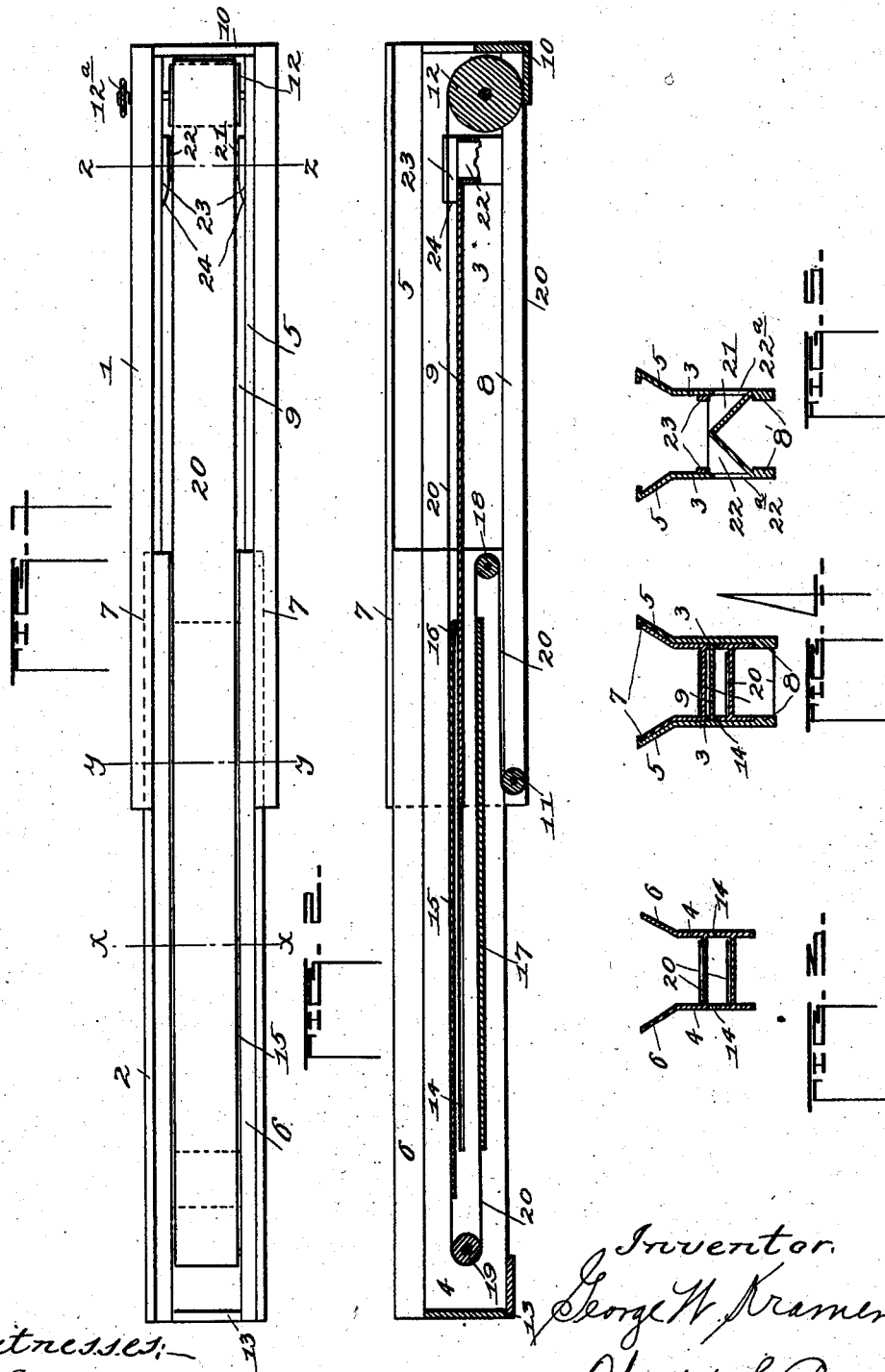
Witnesses:
J. E. Strawn
Inventor
George W. Kramer
By Chas. F. LaPorte
Atty.

UNITED STATES PATENT OFFICE.

GEORGE W. KRAMER, OF PEORIA, ILLINOIS, ASSIGNOR OF ONE-HALF TO CHRISTOPHER W. KRAMER, OF PEORIA, ILLINOIS.

ELEVATOR.

SPECIFICATION forming part of Letters Patent No. 721,571, dated February 24, 1903.

Application filed April 3, 1901. Serial No. 54,171. (No model.)

*To all whom it may concern:*

Be it known that I, GEORGE W. KRAMER, a citizen of the United States, residing at Peoria, in the county of Peoria and State of Illinois, have invented certain new and useful Improvements in Elevators; and I do hereby declare that the following is a full, clear, and exact description of the invention, which will enable others skilled in the art to which it appertains to make and use the same.

This invention has reference to elevators or conveyers, and relates more particularly to an extensible telescoping conveyer adapted for use in feeding corn to corn-shellers.

The object which I have in view is the provision of a telescopic extensible elevator or feeder the conveyer of which is constructed of one piece of belting and so carried to be actuated in said elevator or feeder as to adapt itself to the extensibility of the section of the feeder; and the invention further consists in the detail construction and arrangement of parts hereinafter more fully pointed out in the specification and claimed in the appended claims, due reference being had to the accompanying drawings, forming a part of this specification, in which—

Figure 1 is a plan view of my improved elevator or feeder. Fig. 2 is a longitudinal section of the same. Fig. 3 is a cross-section on the line X X of Fig. 1. Fig. 4 is a cross-section on the line Y Y of Fig. 1. Fig. 5 is a cross-section on the line Z Z of Fig. 1.

In constructing a telescopic extensible conveyer or feeder, such as I shall hereinafter describe more fully in detail, I have aimed to overcome one or more serious objections and difficulties which are ever present in belt conveyers, and especially in those which are extensible.

1 and 2 refer to sections of my conveyer or feeder which are arranged to be extended or telescoped. Section 1 has side frame-pieces 3, with beveled or deflected upper portions 5, and in like manner the section 2 has the side frame-pieces 4 and the beveled or deflected upper portions 6, and the sections 1 and 2 are dovetailed into each other, as shown at 7, and the lower edges of the section 2 slide in and out on cleats 8 of section 1, said cleats forming a part of or attached to the sides 3, as shown. The section 1 is provided with the longitudinally-arranged partition or bottom 9, located about central of the section, and extends from the inner end to a point removed from the outer end, and the outer end has the partially-inclosed bottom and end portion 10, and 11 is a small roller journaled in the sides of the section 1, at the inner end of the same, contiguous to the lower edges of the sides 3. 12 is a similar roller, but much larger in diameter, journaled in the sides 3 at the forward end thereof, carried on the spindle which supports said roller, and arranged to impart power thereto is a sprocket-wheel $12^a$, located on the outside of the section, as shown, and actuated by sprocket-chain connection with the sprocket *c* of the drag C. The section 2 has the open inner end and partially-closed bottom and outer end 13, as shown. The sides 2 are arranged with slots 14, extending from the inner ends to a suitable point near their outer ends, and in these slots or open ways is arranged to slide the partition or bottom 9 of the section 1. 15 is a partition arranged longitudinally in the section 2, of suitable length and in such a position that when the sections are telescoped into each other the partition 15 will lie above and adjacent to the upper face of the partition 9, the inner end tapered substantially as at 16, which will cause the inner end thereof to bear against the upper face of the partition 9. 17 is a longitudinal partition located in the section 2 and beneath the partition 15 and of suitable length, and the arrangement is such that when the sections are telescoped into each other it will lie below the partition 9, as shown in Fig. 2. 18 refers to a roller similar to the roller 11 and is journaled in the sides 4 of the section 2 at their inner ends and near the lower edges, and 19 refers to a similar roller, which is journaled in the sides 4 and about central thereof and contiguous to the outer end. With this description of the construction and arrangement of the manner of telescoping the section the provision of the rollers, such as I have described, enables me to provide a conveyer for said feeder which may be extended to accommodate itself to the extension of the sections or to the telescoping of the same within themselves, and this, with an endless belt, having a smooth carrying-face without having to add to or take away from the same any sections or parts to allow it to accommodate itself to the extension or telescoping of the sections.

The conveyer consists of the belt 20, which is passed around the roller 19 and along over the top of the partitions 15 and 9 to the delivery end of the elevator and thence around the roller 12 and forward to the roller 11 and around said roller and bringing it toward the roller 12, is passed around the roller 18 and along over the top of the lower partition 17, and is joined or coupled in any suitable manner to its matching end, which was described as passing around the roller 19. This arrangement is clearly seen and also understood from an examination of Fig. 2. Thus it will be seen that the roller 18 acts as an idler around which the belt 20 is carried and keeps the same taut, as by extending the section 2 the roller 18 moves toward the forward end of the section 1 and will permit the carrying-face on the upper face of the partitions 15 and 9 to be extended, and likewise when the sections are being telescoped into each other the movement of the roller 18 toward the delivery end will take up the slack incident to such telescoping, and the carrier remains taut.

I have made provision in this device when used for conveying corn to a corn-sheller to take care of any grain of corn shelled from the cobs as they are passed to the drag to permit the same from cutting and wearing out the under surface of the belt, which would be the case if the shelled corn were dragged and allowed to pass between the roller 12 and the belt. It is very easy for loose grains of corn to become lodged between the belt and the partitions 9 and 15, and if there were no provisions for carrying off this loose grain the same would be dragged along upon the upper face of the partitions described and passed over the roller 12, which would in a short time cut and wear away the belt, and to take care of this loose grain I have provided in the length of the section 1 and contiguous to the roller 12 the chutes 21 and 22, extending from the center of the partition 9 in a slanting direction and have the open ways 22ª in the sides 3 communicating with said chutes, and 23 are guides lying on the face of the partition 9, having the beveled inner ends 24. This arrangement insures that when the grain is being dragged along the surface of the partition 9 the guideways 24 will direct the same into the chutes and they together will form a substantial V, which will cause the grain to be dropped out through the open ways 22ª in the sides 3.

Another advantage which my feeder has is that, providing a conveyer on which I use no attachment or slats, I can run the same very fast, which will insure a steady feed of material to the sheller, and one of the difficult things which I overcome is the necessity of having to stop feeding a slow conveyer when the mouth of the machine becomes crowded, as it is well known in the use of slow conveyer or feeder where they use slats, the mouth of the machine will become clogged and having to stop feeding the feeder there will be a period when there will be no material in the machine; but in a conveyer or feeder of the character described I can run at an increased speed, and if it so chances that the feed of the elevator or feeder is greater than the capacity of the machine the material in the elevator can remain almost at a standstill, as the belt can slip beneath the material and continue to be run, and when the machine being fed has caught up with the supply there will be no time when there is a lack of supply, because as soon as the mouth of the machine is freed the material in the elevator will be fed thereto.

I do not wish to confine myself to the detailed construction and arrangement of parts as illustrated, as it is obvious that various changes may be made in the material used, the general design, and details resorted to, all of which will come within the scope and principle of the invention herein.

Having thus fully described my invention, what I claim, and desire to secure by Letters Patent of the United States, is—

1. A feeder for corn-shellers, comprising telescopic sections, one section having slots in its walls and a partition in the opposite section arranged to slide in said slots, rollers in said sections and an extensible endless belt traveling around said rollers, substantially as described.

2. A feeder for corn-shellers, consisting of two sections arranged to be extended or telescoped into each other and having dovetailed portions as shown, rollers journaled in the sections and an endless-belt carrier traveling around said rollers, one section having slots in its walls and a partition in the opposite section arranged to slide in said slots and oppositely-arranged discharge-chutes arranged at a suitable point in one of the sections, as described.

3. A feeder for corn-shellers, comprising telescopic sections, each section provided with deflected walls arranged to dovetail as shown, rollers of each section and an endless-belt carrier having a smooth carrying-surface traveling around the rollers which are arranged to permit the carrier to adapt itself to the extension and telescoping of the section, and discharge-chutes located at a suitable point in one of the sections, substantially as described.

4. A feeder for corn-shellers, comprising the sections 1 and 2, each section having deflected side walls, rollers arranged respectively at the inner and outer ends of each section, an endless-belt carrier having a smooth carrying-surface traveling around said rollers, the partition 9 in section 1 arranged to telescope in slots arranged in the walls of the opposite section and the partition 15 in section 2 arranged to telescope above the partition 9 in section 1, substantially as described.

5. A feeder for corn-shellers, comprising the sections 1 and 2, each having deflected side walls and arranged to telescope, cleats 8 of the section 1, the partition 9 and the transverse chutes 21 and 22 located at one end of said partition and removed from the end of the section, partitions 15 and 17 arranged above and below elongated slots in the walls of said section 2 into which the partition 9 telescopes, rollers arranged in said sections and an endless-belt carrier traveling around said rollers and above the partitions 9 and 15 and above the partition 17 and traveling the length of the section 2, substantially as described.

6. In an extensible corn-conveyer, the combination with the telescopic sections 1 and 2, each having portions of their side walls deflected and the sections 2 movable on cleats 8 in section 1 and dovetailed into each other at 7, the section 2 having elongated slots 14 in its walls extending through a part of their lengths, the partition 9 in section 1 working in said slots and the inclined discharge-chutes 21 and 22 in section 1 and the openings 22ª, in the walls of said section, the rollers 12 and 19 and the take-up rollers 11 and 18 and the extensible belt 20 traveling around said rollers, substantially as described.

7. In combination with the section 1 the side walls of which have deflected upper portions 5 and provided with the partition 9 and oppositely-arranged chutes 21 and 22 arranged for discharging loose material through open ways 22ª, in the walls thereof and the guides 23 arranged as shown, of the extensible section 2 having upper deflected wall portions 6 and provided with partitions 15 and 17 and slots 14 in the walls of said section in which the partition 9 has a sliding and bearing relation when the sections are telescoped or extended, the rollers 11, 12, 18 and 19, and the endless carrier-belt 20 traveling around said rollers, all arranged substantially as described and shown.

8. The combination of the telescopic sections 1 and 2 having the matching side walls 3 and 4 constructed to telescope as herein shown and each provided with rollers, an endless belt traveling around the same in such a manner as to permit the same to be extended or shortened in the extension of or telescoping of said sections, the section 1 provided with the partition 9 and the walls of the section 2 suitably cut away to accommodate the partition 9 during such telescoping, and the partitions 15 and 17 in the section 2 and one or more discharge-chutes of section 1, with openings in the walls thereof communicating with such chute or chutes and arranged between the upper and lower length of the endless belt, substantially as described and shown.

9. A feeder for corn-shellers, comprising two sections operatively telescopic one within the other, a partition in one section coacting with open ways in the walls of the opposite section for guiding the said sections, rollers in said sections and an extensible endless belt traveling around said rollers, substantially as described.

10. A feeder for corn-shellers, comprising telescopic sections having matching side walls, a partition in one section operatively telescopic in the walls of the opposite section, and lying below a partition in said opposite section, rollers in said sections and an endless extensible belt traveling around said rollers, substantially as described.

11. A feeder for corn-shellers, comprising two telescopic sections having matching side walls, guides on one section for the upper and lower edges of the side walls of the opposite section, a partition in the first-mentioned section operatively telescopic in the walls of the opposite section, rollers in said sections, and an extensible endless belt traveling around said rollers, substantially as described.

12. A feeder for corn-shellers, comprising two telescopic sections, the inner section guided by the outer section which has upper and lower longitudinal guides, a partition of the outer section coacting with the walls of the inner section, partitions of the inner section lying above and below the aforementioned partition, rollers in said sections and an endless belt traveling around said rollers, substantially as described.

In testimony whereof I affix my signature in presence of two witnesses.

GEORGE W. KRAMER.

Witnesses:
ROBERT N. MCCORMICK,
CHAS. W. LA PORTE.